April 28, 1931.  K. KOLLINEK  1,802,724
BRAKE FOR AIRCRAFT
Filed May 27, 1930

Patented Apr. 28, 1931

1,802,724

UNITED STATES PATENT OFFICE

KURT KOLLINEK, OF LICHTENBERG, BERLIN, GERMANY, ASSIGNOR TO KNORR-BREMSE AKTIENGESELLSCHAFT, OF BERLIN, GERMANY, A CORPORATION OF GERMANY

BRAKE FOR AIRCRAFT

Application filed May 27, 1930, Serial No. 456,248, and in Germany October 7, 1929.

This invention relates to brakes for aircraft landing wheels and particularly to compressed air brakes, by means of which the run of the aircraft after landing upon the ground is shortened, and at the same time the aircraft can be steered by differential braking forces applied to the landing wheels on opposite sides of the aircraft.

Such a brake is known in which the brake lever acts upon a differential gear, which in its turn acts upon the adjustment lever of the brake valves, the turning of the brake lever in one plane causing a uniform operation of the brake valves for braking on a straight run while turning the lever in another plane causes a differential operation of the brake for braking and simultaneously steering the air-craft. In this known brake, in order to assist the pilot when landing, the differential turning movement of the brake lever can be effected by means of the pedal levers of the lateral rudder as soon as the brake lever is in the operative position, and in this way a combined action of the brake lever and the pedal levers of the lateral rudder is obtained.

An object of the present invention is to provide a simplified apparatus without differential gearing for accomplishing either even braking for straight running or uneven braking for steering after landing. Other objects and advantages of the invention will be apparent from the following description read in conjunction with the accompanying drawings or diagrams, which illustrate in perspective three constructional examples of the invention.

The brakes (not shown) are of any suitable construction and are controlled by valves $a, a^1$ which serve for filling and emptying the brake cylinders when the valve levers $a^2, a^3$ are actuated by traction on flexible members $b, b^1$ in the form of ropes, which are connected to the ends of the said valve levers. The ropes are fastened to the pedal levers $e, e^1$ which actuate the laterally movable rudder $h$; and also are connected to the brake lever $g$ pivoted at $g^1$.

Figure 1:
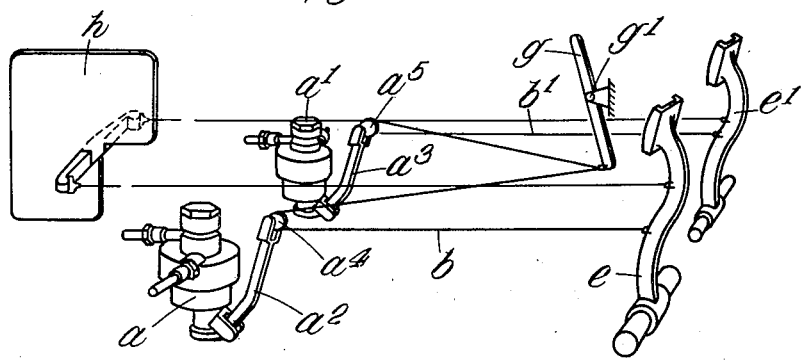
Figure 1 represents a modification in the position of uniform braking.

When the brakes are not in use and the lever $g$ is in the position seen in Figure 1, actuation of either of the pedal levers $e, e^1$ effects the turning of the rudder $h$ but has no action on either of the brake vales $a, a^1$.

Figure 2:
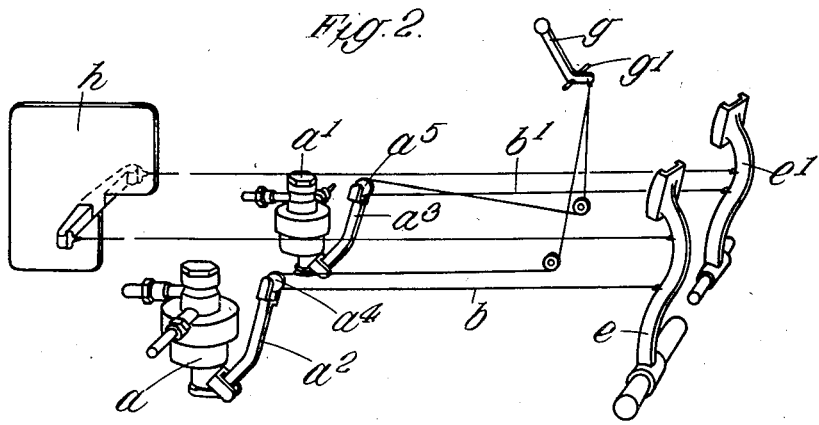
Figure 2 represents another modification also in the position of uniform braking.

When the aircraft on landing reaches the ground, the brake lever $g$ is brought into the position shown in Figure 2, and the ropes $b, b^1$ are caused to exert traction on the valve levers $a^2, a^3$, so that both brakes are uniformly applied. If it be desired to steer the aircraft to right or left while running on the ground, one of the pedal levers $e$ or $e^1$ is pressed forward, the other pedal lever automatically moving to the rear to the same extent. At the same time the first pedal lever exerts traction on the rope ($b$ or $b^1$) connecting it with one of the brake valve levers, and increases the brake action on that side, while the rope at the other side is slackened and allows the associated brake valve to cut off the feed of air to the corresponding brake cylinder or even to exhaust it. Thus the aircraft is braked on one side and consequently makes a turning movement.

In Figure 1 the ropes $b, b^1$ each constitute a single loop or bight passing around a guide pulley ($a^4$ or $a^5$) carried on the end of the valve lever, the ends of the rope being respectively secured to the brake lever $g$ and to the corresponding pedal lever.

Other variations in the arrangement of the constructional parts employed could be made without departing from the principle of this invention or sacrificing the advantages thereof, and it is to be understood as including any modifications which fall within the scope of the following claim.

What I claim as my invention and desire to secure by Letters Patent of the United States is:—

In an aircraft, a rudder, a pedal to operate said rudder, a brake lever, a brake having a valve lever and operable by rope traction, a pulley on said valve lever, and a rope guided around said pulley, said rope being fastened at one end to said pedal and at the other end to said brake lever.

KURT KOLLINEK.